United States Patent [19]
Schleifstein et al.

[11] Patent Number: 4,957,957
[45] Date of Patent: Sep. 18, 1990

[54] POLYMER COMPOSITIONS CONTAINING AROMATIC SULFONAMIDE

[75] Inventors: Robert A. Schleifstein, Baton Rouge, La.; David S. Pietrewicz, Elgin, S.C.

[73] Assignee: Ethyl Corporation, Richmond, Va.

[21] Appl. No.: 359,528

[22] Filed: Jun. 1, 1989

[51] Int. Cl.$^5$ .................................................. C08K 5/43
[52] U.S. Cl. .................................... 524/169; 524/371; 524/411
[58] Field of Search ................... 524/169; 564/90, 91, 564/92

[56] References Cited

U.S. PATENT DOCUMENTS

| | | | |
|---|---|---|---|
| 3,760,003 | 9/1973 | Asadorian | 524/371 |
| 4,123,411 | 10/1978 | Coran | 524/169 |
| 4,218,357 | 8/1980 | Mark et al. | 524/169 |
| 4,254,015 | 3/1981 | Thomas et al. | 524/169 |
| 4,399,246 | 8/1983 | Hyde | 524/169 |
| 4,486,560 | 12/1984 | Thomas | 524/169 |
| 4,745,143 | 5/1988 | Mason | 524/169 |

FOREIGN PATENT DOCUMENTS 51-46089 12/1976 Japan .

OTHER PUBLICATIONS

*Chemical Abstract* 58:5671e.
*Chemical Abstract* 58:3341c
*Chemical Abstract* 66(9):37571a.
*Chemical Abstract* 66(3):10128z.
*Chemical Abstract* 64:8383f.

*Primary Examiner*—Veronica P. Hoke
*Attorney, Agent, or Firm*—John F. Sieberth; David E. LaRose

[57] ABSTRACT

Described are thermoplastic polymer compositions (e.g., nylon) containing a polyhaloaromatic sulfonamide in quantity sufficient to improve the melt flow properties of the polymer. Such sulfonamides contain (a) from 7 to 30 carbon atoms, (b) from 2 to 12 chlorine and/or bromine atoms, (c) one nitrogen atom, (d) an aromatic group, bonded to the sulfur atom, in which at least two chlorine or at least two bromine atoms or at least one chlorine atom and at least one bromine atom are directly bonded to the aromatic ring system, and (e) one or two aliphatic, cycloaliphatic, or aromatic organic groups bonded to the nitrogen atom, one such organic group, when an aromatic group, optionally being substituted by one or more bromine and/or chlorine atoms. These sulfonamides are of advantage in that they have relatively low volatilities and good thermal stability at polymer processing temperatures and serve as flame retardants therein.

9 Claims, No Drawings

POLYMER COMPOSITIONS CONTAINING AROMATIC SULFONAMIDE

This invention provides thermoplastic condensation polymer compositions having improved melt flow characteristics by virtue of the incorporation therein of certain sulfonamide plasticizers. The additives also contribute flame retardancy to polymers in which they are blended. The sulfonamides used pursuant to this invention have relatively low volatilities at polymer processing temperatures and thus minimize the extent to which the additive is vaporized during polymer processing. This in turn reduces the extent to which ambient air quality is impaired during processing.

As is well known, good polymer melt flow is an important property, as polymer formulations having inadequate flow properties can give rise to burning and incomplete article formation during molding operations.

The sulfonamide used as additives pursuant to this invention are polyhaloaromatic sulfonamides containing in the molecule (a) from 7 to 30 carbon atoms (preferably 8 to 24), (b) from 2 to 12 halogen atoms (chlorine or more preferably bromine), (c) one nitrogen atom, (d) an aromatic group, bonded to the sulfur atom, in which at least two chlorine or more preferably at least two bromine atoms, or at least one chlorine atom and at least one bromine atom are directly bonded to the aromatic ring system, and (e) one or two organic (aliphatic, cycloaliphatic, or aromatic) groups bonded to the nitrogen atom. One such organic group, when an aromatic group, optionally is substituted by one or more bromine or chlorine atoms. In a preferred embodiment these sulfonamides contain from 3 to 8 and most preferably from 3 to 6 halogen atoms (chlorine, bromine or a mixture of both) bonded to the aromatic ring system. The presence of such halogen atoms as aromatic ring substituents contributes enhanced thermal stability and flame retardant characteristics to the additive.

Among the sulfonamides utilized pursuant to this invention are those represented by the general formula

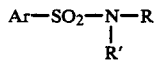

where Ar is a haloaromatic group in which least two bromine or chlorine atoms are bonded to the ring system, R is a hydrocarbon group, and R' is a hydrogen atom, a hydrocarbon group or a haloaromatic group. Most preferably the total number of halogen atoms (chlorine and more preferably bromine) in the molecule is from 2 to 10, preferably from 3 to 6.

One preferred type of haloaromatic sulfonamide utilized pursuant to this invention may be represented by the general formula

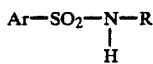

where Ar is a haloaromatic group in which least three bromine or chlorine atoms are bonded to the ring system, and R is a hydrocarbon or haloaromatic group.

Another preferred type of haloaromatic sulfonamide utilized pursuant to this invention may be represented by the general formula

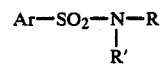

where Ar is a haloaromatic group in which least three bromine or chlorine atoms are bonded to the ring system, and each of R and R' is a hydrocarbon group.

A particularly preferred type of haloaromatic sulfonamide utilized pursuant to this invention may be represented by the general formula

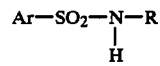

where Ar is a mononuclear bromoaryl group having 6 to 10 carbon atoms and 3 to 5 bromine atoms on the ring, and R is a $C_1$ to $C_{12}$ alkyl group, or a $C_6$ to $C_{12}$ aryl or bromoaryl group.

Another particularly preferred type of haloaromatic sulfonamide utilized pursuant to this invention may be represented by the general formula

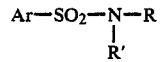

where Ar is a mononuclear bromoaryl group having 6 to 10 carbon atoms and 3 to 5 bromine atoms on the ring, R is a $C_1$ to $C_{12}$ alkyl group, or a $C_6$ to $C_{12}$ aryl or bromoaryl group, and R' is a $C_1$ to $C_{12}$ alkyl group, or a $C_6$ to $C_{12}$ aryl or bromoaryl group.

A few illustrative additives useful in the practice of this invention include

N-methyl-(dibromobenzene)sulfonamide,
N-ethyl-(dibromobenzene)sulfonamide,
N-propyl-(dibromobenzene)sulfonamide,
N-hexyl-(dibromobenzene)sulfonamide,
N-octyl-(dibromobenzene)sulfonamide,
N-decyl-(dibromobenzene)sulfonamide,
N-dodecyl-(dibromobenzene)sulfonamide,
N-isopropyl-(dichlorobenzene)sulfonamide,
N-pentyl-(dichlorobenzene)sulfonamide,
N-heptyl-(dichlorobenzene)sulfonamide,
N-nonyl-(bromochlorobenzene)sulfonamide,
N-undecyl-(bromochlorotoluene)sulfonamide,
N-cyclopentyl-(dichlorobenzene)sulfonamide,
N-cyclohexyl-(dibromobenzene)sulfonamide,
N-cyclooctyl-(bromochloroxylene)sulfonamide,
N-phenyl-(dichlorobenzene)sulfonamide,
N-phenyl-(dibromobenzene)sulfonamide,
N-phenyl-(dibromotrimethylbenzene)sulfonamide,
N-tolyl-(butyldibromobenzene)sulfonamide,
N-biphenylyl-(bromochloroxylene)sulfonamide,
N-1-naphthyl-(dibromobenzene)sulfonamide,
N-2-naphthyl-(dichlorobenzene)sulfonamide,
N-1-tetrahydronaphthyl-(dibromobenzene)sulfonamide,
N-(9-anthracenyl)-(dichlorobenzenesulfonamide),
N-methyl-(tribromobenzene)sulfonamide,
N-ethyl-(tribromobenzene)sulfonamide,
N-propyl-(tribromobenzene)sulfonamide,
N-hexyl-(tribromobenzene)sulfonamide,
N-octyl-(tribromobenzene)sulfonamide, N-decyl-(tribromobenzene)sulfonamide,
N-dodecyl-(tribromobenzene)sulfonamide,
N-isopropyl-(trichlorobenzene)sulfonamide,
N-pentyl-(trichlorobenzene)sulfonamide,
N-heptyl-(trichlorobenzene)sulfonamide,
N-nonyl-(dibromochlorobenzene)sulfonamide,
N-undecyl-(bromodichlorotoluene)sulfonamide,
N-cyclopentyl-(trichlorobenzene)sulfonamide,
N-cyclohexyl-(tribromobenzene)sulfonamide,
N-cyclooctyl-(bromodichloroxylene)sulfonamide,
N-phenyl-(trichlorobenzene)sulfonamide,
N-phenyl-(tribromobenzene)sulfonamide,
N-phenyl-(tribromophenylbenzene)sulfonamide,
N-tolyl-(butyltribromobenzene)sulfonamide,
N-biphenylyl-(dibromochloroxylene)sulfonamide,
N-1-naphthyl-(tribromobenzene)sulfonamide,
N-2-naphthyl-(trichlorobenzene)sulfonamide,
N-1-tetrahydronaphthyl-(tribromobenzene)sulfonamide,
N-(9-anthracenyl)-(trichlorobenzenesulfonamide),
N-methyl-(tetrabromobenzene)sulfonamide,
N-ethyl-(tetrabromobenzene)sulfonamide,
N-propyl-(tetrabromobenzene)sulfonamide,
N-tert-butyl-(tetrabromobenzene)sulfonamide,
N-hexyl-(tetrabromobenzene)sulfonamide,
N-octyl-(tetrabromobenzene)sulfonamide,
N-decyl-(tetrabromobenzene)sulfonamide,
N-dodecyl-(tetrabromobenzene)sulfonamide,
N-methyl-(tetrachlorobenzene)sulfonamide,
N-ethyl-(dibromodichlorobenzene)sulfonamide,
N-propyl-(tetrachlorobenzene)sulfonamide,
N-butyl-(tetrachlorobenzene)sulfonamide,
N-hexyl-(tetrachlorobenzene)sulfonamide,
N-octyl-(tetrachlorobenzene)sulfonamide,
N-decyl-(tetrachlorobenzene)sulfonamide,
N-dodecyl-(tetrachlorobenzene)sulfonamide,
N-methyl-(pentabromobenzene)sulfonamide,
N-ethyl-(pentabromobenzene)sulfonamide,
N-propyl-(pentabromobenzene)sulfonamide,
N-hexyl-(pentabromobenzene)sulfonamide,
N-octyl-(pentabromobenzene)sulfonamide,
N-decyl-(pentabromobenzene)sulfonamide,
N-dodecyl-(pentabromobenzene)sulfonamide,
N-tribromophenyl-(tribromobenzene)sulfonamide,
N-phenyl-(pentabromobenzene)sulfonamide,
N-tribromophenyl-(tribromobenzene)sulfonamide,
N-cyclohexyl-(dibromotoluene)sulfonamide,
N-octyl-(tetrachlorobenzene)sulfonamide,
N-isobutyl-(dibromotrichlorobenzene)sulfonamide,
N-butyl-(octabromobibenzene)sulfonamide,
N,N-dimethyl-(dibromobenzene)sulfonamide,
N,N-diethyl-(tribromobenzene)sulfonamide,
N,N-dipropyl-(dichlorobenzene)sulfonamide,
N,N-dibutyl-(tribromobenzene)sulfonamide,
N-methyl-N-octyl-(pentabromobenzene)sulfonamide,
N,N-diphenyl-(tribromobenzene)sulfonamide,
N,N-dicyclohexyl-(tetrabromobenzene)sulfonamide,
N,N-di(dichlorophenyl)-(trichloroxylene)sulfonamide,
N,N-dimethyl-(tetrachlorobenzene)sulfonamide,
N,N-dipentyl-(dichlorophenoxybenzene)sulfonamide,
N,N-dibutyl-(octachlorobibenzene)sulfonamide,
N-cyclopentyl-N-octyl-(trichlorophenylcarbinylbenzene)sulfonamide,
N,N-dinonyl-(bromochlorobenzene)sulfonamide,
N-methyl-N-(1,2,3,4-tetrahydro-1-naphthyl)-(tribromobenzene)-sulfonamide),
and
N,N-di(tetradecyl)-(tribromobenzene)sulfonamide.

General methods which can be utilized for the preparation of the additives used pursuant to this invention are known and reported in the literature. The most common procedure is to react a polyhaloaromatic sulfonyl halide with an aliphatic, cycloaliphatic or aromatic primary or secondary amine. For further details concerning applicable synthesis procedures, see for example Holmsen, U. S. Pat. No. 3,281,233; Kirsanov, et al., Zh. Obshch. Khim., 1962, Vol. 32, 887-92; El-Hewehi, et al., J. Prakt. Chem., 1962, Vol. 16 No. 5-6, 297-336; El-Hewehi, et al., J. Prakt. Chem., 1966, Vol. 34 No. 5-6, 218-242; and Kuliev, Dokl. Akad. Nauk Az. SSR, 1976, Vol. 32 (4) 25-29, all disclosures of which are incorporated herein by reference.

A wide variety of thermoplastic condensation polymers may be used in forming the compositions of this invention. Included are such thermoplastics as polyamides (all types of nylons such as nylon 3, nylon 4, nylon 6, nylon 6,6, nylon 6,10, nylon 6,12 nylon 7, nylon 8, nylon 11, nylon 12, nylon 12,12, etc.) polyesters (e.g., polyethylene terephthalate, polybutylene terephthalate, etc.), polycarbonates, polyphenylene oxides either singly or in blends with polystyrenes (both rubber-free and rubber-modified), and the like. Polyolefins (e.g., polyethylenes, polypropylenes, etc.) may also be flame retarded pursuant to this invention. Of the condensation polymers, nylon 6 (polycaprolactam), nylon 6,6 (the polyamide of hexamethylene diamine and adipic acid), nylon 12 (polylaurolactam), and nylon 12,12 (the polyamide of laurolactam and dodecanedioic acid) are particularly preferred.

The concentration of the polyhaloaromatic sulfonamides used will of course be dependent to some extent upon the identity and properties of the substrate thermoplastic polymer and of the particular additive system being employed therein, as well as the properties desired in the finished product. Generally speaking, however the polymer will normally contain an amount of polyhaloaromatic sulfonamide falling in the range of from about 1 to about 20, and preferably from about 2 to about 10, parts by weight per hundred parts by weight of the total thermoplastic composition. However departures from these ranges are entirely permissible and are within the ambit of this invention. Those skilled in the art can readily determine optimal proportions by the simple expedient of performing a few simple tests with the materials selected for use.

Methods for blending the additives into the substrate polymers are conventional and well known to those skilled in the art.

The advantages of employing polyhaloaromatic sulfonamides in the manner of this invention is illustrated by the enhanced thermal stability of a typical polyhaloaromatic sulfonamide as compared to typical halogen-free aromatic sulfonamides of the type normally used as plasticizers in nylon. In a series of experiments, thermogravimetric thermal decomposition onset values of such materials were as follows:

N-butyl-(tribromobenzene)sulfonamide; 278.1.C.
N-ethyl-benzenesulfonamide; 217.7.C.
N-propyl-benzenesulfonamide; 224.1.C.
N-isopropyl benzenesulfonamide; 220.1 C.
N-cyclohexyl-benzenesulfonamide; 220.9.C.

The improvements achievable in melt flow characteristics were illustrated in experiments employing a commercially available nylon-6,6 (ZYTEL resin), containing tetradecabromodiphenoxybenzene (SAYTEX 120 flame retardant) and antimony oxide, in the weight proportions of 81% nylon, 14% tetradecabromodiphenoxybenzene and 5% antimony oxide. Melt index and heat deflection temperature (HDT) determinations on this polymer with and without a sulfonamide of this invention are shown in the following table.

| Sulfonamide | Amount | Melt Index, g per 10 min. 275° C./550 g ASTM D 1238 | HDT, °C. at 264 psi ASTM D 648 |
| --- | --- | --- | --- |
| None | None | 7.1 | 249 |
| N-butyl-(tribromobenzene)sulfonamide | 3% | 36.2 | 246 |

Other conventionally used additives such as reinforcing fillers, pigments, mold release agents, nucleating agents, flame retardants, flame retardant synergists (antimony oxide, zinc borate, ferric oxide, etc.), heat stabilizers, U.V. stabilizers, antioxidants, and the like may be included in the compositions of this invention. Such additives may be employed in their customary concentrations. A particularly preferred additive complement, especially for use in nylon, is the combination of tetradecabromodiphenoxybenzene and antimony oxide wherein the polymer contains from about 10 to about 15 weight percent of the tetradecabromodiphenoxybenzene and from about 3 to about 6 weight percent of the antimony oxide.

In accordance with preferred embodiments of this invention, the polymer composition contains both a polyhaloaromatic sulfonamide and an additional, conventional polyhaloaromatic flame retardant (i.e., an aromatic flame retardant devoid of the sulfonamide functional group). A wide variety of such polyhaloaromatic flame retardants are suitable for use in such compositions. One preferred type is the halogenated polyphenylene ethers described in U. S. Pat. No. 3,760,003, all disclosure of which is incorporated herein reference. Another preferred type is the polyhalodiphenyl oxides, especially those containing from 12 to 20 carbon atoms in the molecule (i.e., two phenyl groups which may be alkyl-substituted) and from 4 to 10 halogen atoms (chlorine, a mixture of chlorine and bromine, and preferably bromine). See for example U. S. Pat. No. 3,624,024, all disclosure of which is incorporated herein. Also useful are the polyhalodiphenyl carbonates such as described in U. S. Pat. No. 3,624,024, especially those containing from 13 to 21 carbon atoms in the molecule (i.e., two phenyl groups which may be alkyl-substituted) and from 4 to 10 halogen atoms (chlorine, a mixture of chlorine and bromine, and preferably bromine). Still another preferred type is the alkylenebis(polyhalodiphenyls) having from 13 to about 24 carbon atoms and from 4 to 10 ring-substituted halogen atoms of the type described above. Still another type of polyaromatic flame retardant which may be used is the polyhaloaromatics containing from 6 to about 20 and from 4 to 10 ring-substituted halogen atoms of the type described above. Also useful are the alkylenebis(polyhalophthalimides) of the type described in U. S. Pat. Nos. 3,624,024, 3,873,567, 4,087,441 and 4,125,535, all disclosures of which are incorporated herein by reference. Use may also be made of 1:1 Diels-Alders adducts between a polyhalogenated anthracene with a multi-unsaturated aliphatic or cycloaliphatic hydrocarbon wherein the residual aromatic groups of the anthracene moiety contain 4 or more halogen atoms, the methods for the synthesis of which is described in U. S. Pat. Nos. 3,904,700 and 3,915,932, all disclosures of which are incorporated herein by reference.

Some illustrative polyhaloaromatic flame retardant compounds of the types described above are decabromodiphenyl oxide, octabromodiphenyl oxide, hexabromodiphenyl oxide, tetradecabromo-1,4-diphenoxybenzene, dodecabromo-1,4-diphenoxybenzene, decabromo-1,4-diphenoxybenzene, tetradecabromo-1,3-diphenoxybenzene, dodecabromo-1,3-diphenoxybenzene, decabromo-1,3-diphenoxybenzene, decabromodiphenylmethane, decabromo-1,2-diphenylethane, octabromo-1,2-diphenylethane, decabromo-1,4-diphenylbutane, 2,2-bis(octabromophenyl)propane, ethylenebis(dibromophthalimide), ethylenebis(tetrabromophthalimide), hexabromobenzene, pentabromotoluene, hexabromodiphenyl, and corresponding chlorine-containing compounds, and the like.

In the practice of this preferred embodiment there is employed an amount of the polyhaloaromatic sulfonamide and polyhaloaromatic non-sulfonamide flame retardant sufficient to impart flame retardancy or flame resistance to the resultant finished composition. For some applications, an amount sufficient to provide a V-1 rating by the UL Standard Test Procedure may be sufficient. For other more sensitive applications where a greater flame retardancy is required, the finished polymer composition should possess a V-0 rating by the UL Test Procedure. The relative proportions as between the polyhaloaromatic sulfonamide and the polyhaloaromatic non-sulfonamide flame retardant can range widely. All that is required is that the composition contain an amount of the polyhaloaromatic sulfonamide component sufficient to improve the melt flow properties of the polymer composition and that, additionally, the polymer composition contain a sufficient amount of the combination of polyhaloaromatic sulfonamide and polyhaloaromatic non-sulfonamide flame retardant sufficient to provide flame retardancy to the polymer composition. In this connection, the amount of the polyhaloaromatic non-sulfonamide flame retardant may be reduced as compared to the amounts conventionally used inasmuch as the polyhaloaromatic sulfonamides themselves contribute significant flame retardancy to the finished composition and thus allow reductions in the quantity of conventional flame retardant in the composition. Generally speaking, the total amount of the combination of polyhaloaromatic sulfonamide and polyhaloaromatic non-sulfonamide flame retardant used in the polymer should be sufficient to provide a bromine content in the finished polymer composition falling in the range of from about 4 to about 15 weight percent bromine or a chlorine content in the finished polymer composition falling in the range of from about 7 to about 21 weight percent chlorine. However, departures from these ranges may be found useful under given circumstances and are within the ambit of this invention.

This invention is susceptible to considerable variation in its practice within the spirit and scope of the appended claims.

What is claimed is:

1. A polyamide or polyolefin polymer composition containing a polybromoaromatic sulfonamide in quantity sufficient to improve the melt flow properties of the polymer, wherein the sulfonamide is represented by the general formula $$Ar-SO_2-\underset{R'}{\underset{|}{N}}-R$$

where Ar is a bromoaromatic group having at least three bromine atoms bonded to the ring system and each R is a hydrocarbon group and each R' is hydrogen or a hydrocarbon group.

2. A composition of claim 1 wherein the sulfonamide is represented by the general formula $$Ar-SO_2-\underset{H}{\underset{|}{N}}-R$$

where Ar is a mononuclear bromoaryl group having 6 to 10 carbon atoms and 3 to 5 bromine atoms on the ring, and R is a $C_1$ to $C_{12}$ alkyl group, or a $C_6$ to $C_{12}$ aryl or bromoaryl group.

3. A composition of claim 1 wherein the sulfonamide is represented by the general formula $$Ar-SO_2-\underset{R'}{\underset{|}{N}}-R$$

where Ar is a mononuclear bromoaryl group having 6 to 10 carbon atoms and 3 to 5 bromine atoms on the ring, R is a $C_1$ to $C_{12}$ alkyl group, or a $C_6$ to $C_{12}$ aryl or bromoaryl group, and R' is a $C_1$ to $C_{12}$ alkyl group, or a $C_6$ to $C_{12}$ aryl or bromoaryl group.

4. A composition of claim 1 further including a polyhaloaromatic flame retardant devoid of the sulfonamide functional group.

5. Nylon containing a polyhaloaromatic sulfonamide in quantity sufficient to improve the melt flow properties of the polymer, the sulfonamide containing in the molecule (a) from 7 to 30 carbon atoms, (b) from 2 to 12 chlorine or bromine atoms, (c) one nitrogen atom, (d) an aromatic group, bonded to the sulfur atom, in which at least two chlorine and/or at least two bromine atoms or at least one chlorine atom and at least one bromine atom are directly bonded to the aromatic ring system, and (e) one or two aliphatic, cycloaliphatic, or aromatic organic groups bonded to the nitrogen atom, one such organic group, when an aromatic group, optionally being substituted by one or more bromine and/or chlorine atoms.

6. A composition of claim 5 wherein the sulfonamide is represented by the general formula $$Ar-SO_2-\underset{H}{\underset{|}{N}}-R$$

where Ar is a haloaromatic group in which least three bromine or chlorine atoms are bonded to the ring system, and R is a hydrocarbon or haloaromatic group.

7. A composition of claim 6 wherein the sulfonamide is N-butyl-(tribromobenzene)sulfonamide.

8. A composition of claim 6 wherein the composition additionally contains tetradecabromodiphenoxybenzene and antimony oxide.

9. A thermoplastic polyolefin polymer containing a polyhaloaromatic sulfonamide in quantity sufficient to impart flame retardancy to the polymer, the sulfonamide containing in the molecule (a) from 7 to 30 carbon atoms, (b) from 2 to 12 chlorine and/or bromine atoms, (c) one nitrogen atom, (d) an aromatic group, bonded to the sulfur atom, in which at least two chlorine or at least two bromine atoms or at least one chlorine atom and at least one bromine atom are directly bonded to the aromatic ring system, and (e) one or two aliphatic, cycloaliphatic, or aromatic organic groups bonded to the nitrogen atom, one such organic group, when an aromatic group, optionally being substituted by one or more bromine and/or chlorine atoms.

* * * * *